United States Patent [19]
Nakata et al.

[11] Patent Number: 4,634,135
[45] Date of Patent: Jan. 6, 1987

[54] STEERING SYSTEM CONTROLLING TRANSVERSE DISPLACEMENT OF A GEAR HOUSING

[75] Inventors: Moritsune Nakata, Yokohama; Tokiyoshi Yanai, Yokosuka; Hirotsugu Yamaguchi, Chigasaki; Megumu Higuchi, Tokyo; Yutaka Aoyama, Yokosuka; Yasuji Shibahata, Yokohama, all of Japan

[73] Assignee: Nissan Motor Co., Ltd., Japan

[21] Appl. No.: 665,744

[22] Filed: Oct. 29, 1984

[30] Foreign Application Priority Data

Jan. 31, 1984 [JP] Japan .................. 59-15709

[51] Int. Cl.⁴ .............................................. B62D 15/00
[52] U.S. Cl. ....................... 280/90; 74/422; 74/583; 180/143; 180/148
[58] Field of Search .................. 280/90, 89; 180/143, 180/148, 150; 74/422, 583

[56] References Cited

U.S. PATENT DOCUMENTS

| | | | |
|---|---|---|---|
| 2,261,155 | 11/1941 | Hedrick | 280/90 |
| 3,593,592 | 7/1971 | Adams | 74/498 |
| 3,926,070 | 12/1975 | Busso | 74/498 |
| 3,958,462 | 5/1976 | Matschinsky et al. | 280/96 |
| 4,301,691 | 11/1981 | Walter | 74/422 |
| 4,522,279 | 6/1985 | Kanazawa | 180/143 |

FOREIGN PATENT DOCUMENTS

| | | |
|---|---|---|
| 2247323 | 4/1973 | Fed. Rep. of Germany . |
| 2206748 | 8/1973 | Fed. Rep. of Germany . |
| 2269441 | 11/1975 | France . |
| 1138449 | 1/1975 | United Kingdom . |

OTHER PUBLICATIONS

Patent Abstracts of Japan, vol. 8, No. 108, 19th May, 1984, p. (M-297) (1545); & JP-A-59-18064), Toyo Kogyo, 30-1-1984.
Patent Abstracts of Japan, vol. 8, No. 26, 3rd Feb. 1984, p. (M-273) (1463); & JP-A-58-183350 (Toyo Kogyo) 26-10-1983.

Primary Examiner—John J. Love
Assistant Examiner—Kenneth R. Rice
Attorney, Agent, or Firm—Lane and Aitken

[57] ABSTRACT

In a vehicle the steering system includes a steering gear housing transversely mounted relative to the vehicle body by means of a plurality of gear housing mount insulators. Each of the gear housing mount insulators elastically supports the gear housing in such a manner as to allow transverse displacement of the gear housing with respect to the vehicle body. A damper is provided to restrain the transverse displacement allowed by the gear housing mount insulators.

6 Claims, 9 Drawing Figures

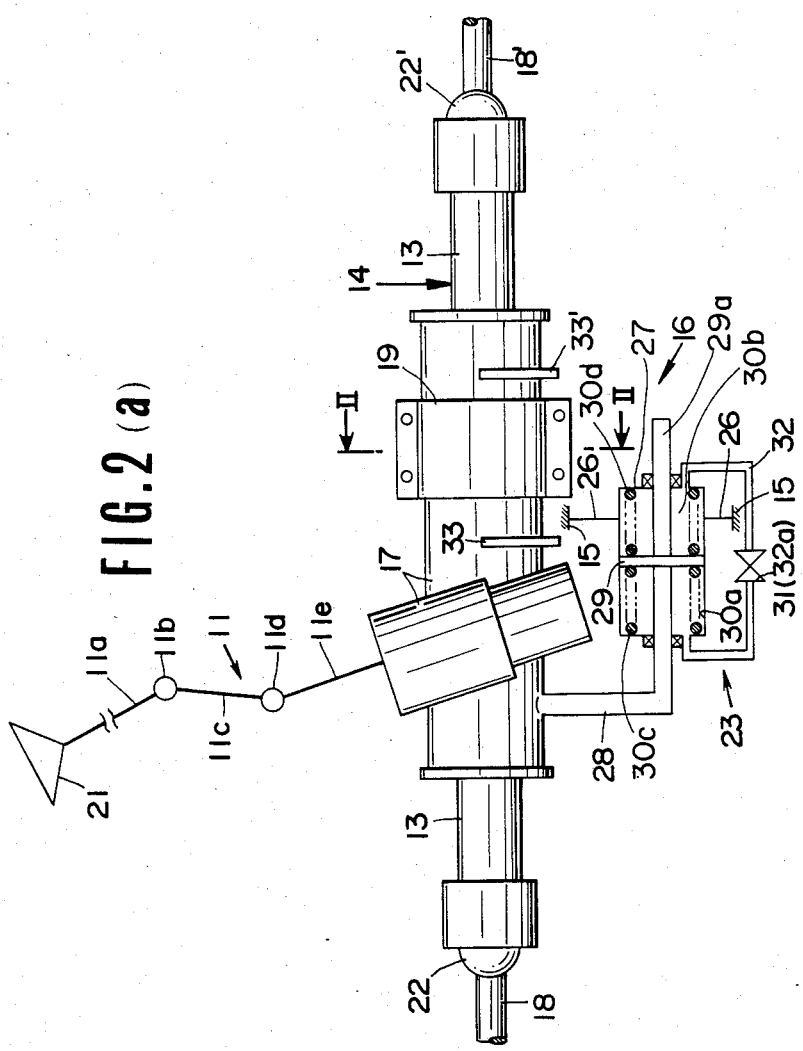
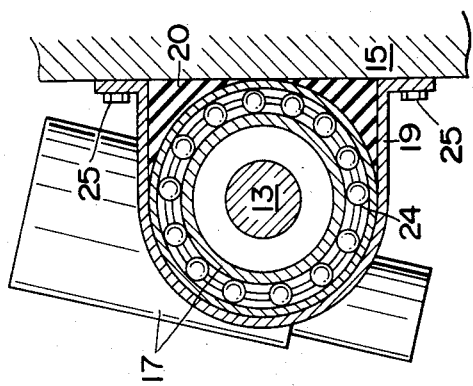

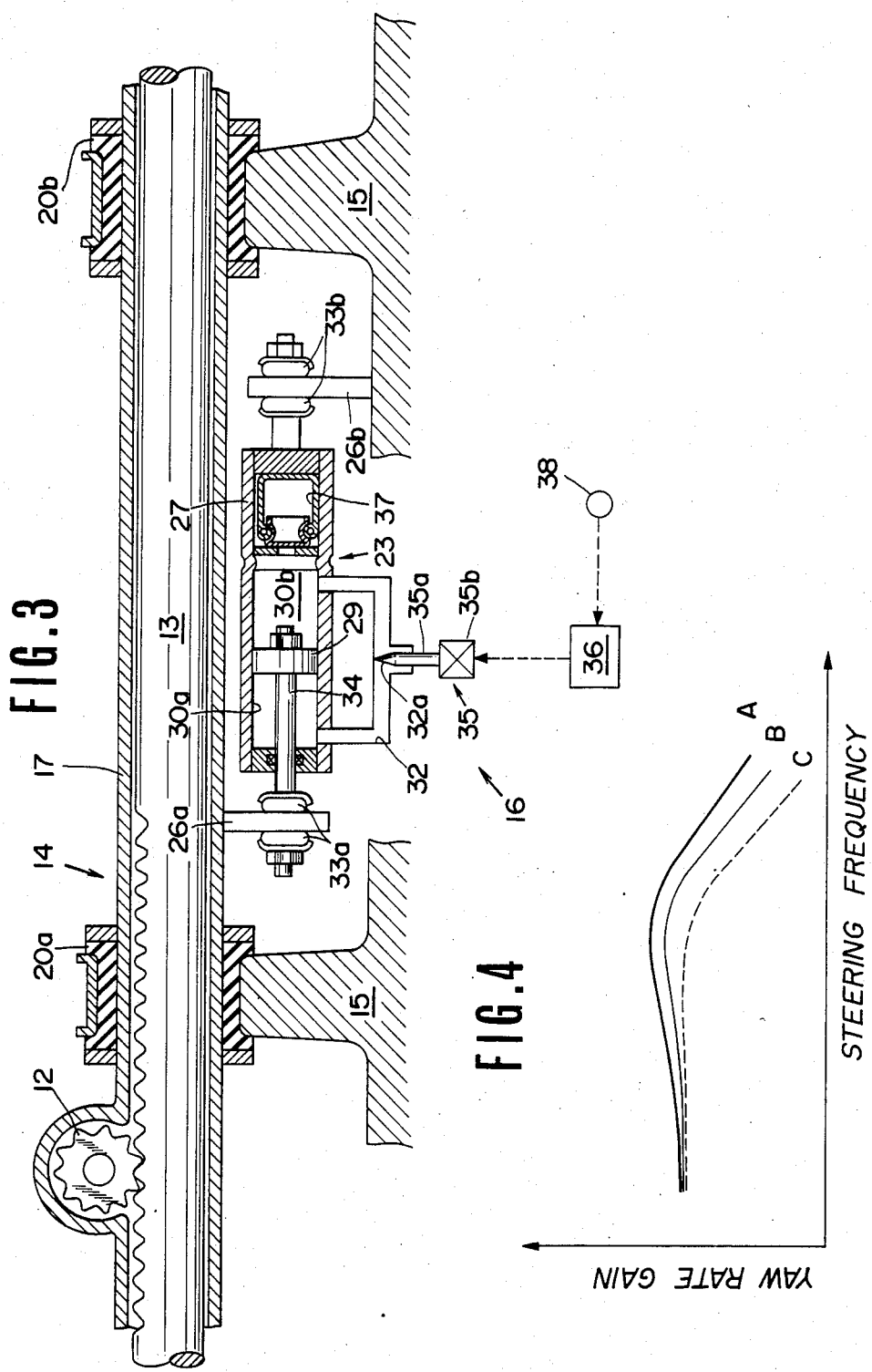

STEERING SYSTEM CONTROLLING TRANSVERSE DISPLACEMENT OF A GEAR HOUSING

BACKGROUND OF THE INVENTION

The present invention relates to a steering system, and more particularly to a steering system wherein the rigidity of a transmission system by which a steering effort applied to a steering wheel is transferred to road wheels is made variable, thereby to enhance the control performance of a vehicle.

Known prior art is a steering system described on Pages 137 to 141 of NISSAN SERVICE MANUAL No. 451 "NISSAN LAUREL SPIRIT" issued by Nissan Motor Company Limited in January 1972. As shown in FIGS. 1a and 1b, this known steering system includes a rack-and-pinion type steering mechanism composed of a pinion 12 connected via a steering shaft 11 to a steering wheel (not illustrated) and a rack 13 extending transversely of a vehicle and meshing with the pinion 12. The steering mechanism 14 is received in a gear housing 17 supported on a vehicle body 15 via a mounting apparatus 16. The rack 13 is slidably received in the gear housing 17 in an axial direction and has both ends thereof connected to change direction road wheels (not shown) via tie rods 18 and 18', respectively. With this steering gear mechanism 14, the pinion 12 rotates when the steering wheel is manipulated, causing the rack 13 to move in its axial direction, and this movement of the rack 13 transfers a torque applied to the steering wheel and an angular displacement of the steering wheel to the road wheels to cause them to change their directions.

The mounting apparatus 16 includes brackets 19a and 19b fixedly secured to the vehicle body 15, and tubular gear housing mount insulators 20a and 20b of a rubber-like elastic body which are mounted between the brackets 19a, 19b and the gear housing 17. The mounting apparatus 16 functions to prevent transmission of vibrations due to bumps from the road to the steering wheel by elastically supporting the gear housing 17.

It is widely known that the rigidity of the steering effort transmission system, including a steering shaft 11, via which a steering effort applied to the mounting apparatus 16 for the steering gear 14 and the steering wheel is transfered to the change direction road wheels which is called "steering rigidity" has a great effect on turning characteristics, control and stability performance, and vibrations transmission characteristics of the vehicle. If the steering rigidity is low, the turning characteristics of the vehicle show an apparent understeer tendency because the steering effort applied to the steering wheel is not smoothly transferred, lowering a steering response, and a portion of displacement of the steering wheel is absorbed by deformation of the transmission system, decreasing a change direction angle of each of the road wheels (change-direction angle), although kicks and shimmies due to transmission of vibrations are reduced. If, on the contrary, the steering rigidity is high, the turning characteristics of the vehicle show an apparent neutral and/or oversteer tendency where straightforward driving ability and steering response of the vehicle are enhanced although kicks and shimmies are easy to be presented to the vehicle body. Therefore, the steering rigidity required for the steering system differs with variation in running state of the vehicle and the rate of displacement of the steering wheel. Therefore, it has been demanded for the purpose of enhancing running stability of the vehicle and improving manipulation feel of the steering wheel that the steering rigidity be varied depending upon running state of the vehicle and rate of displacement of the steering wheel.

However, the previously described prior art steering system fails to meet these demands because the steering rigidity is singularly determined by the gear housing mount insulators 20a and 20b of the mounting apparatus 16 and cannot be varied with variation in running state of the vehicle and the like.

One conceivable measure to vary the steering rigidity is to provide a movement limiting arrangement for limiting the displacement of the gear housing 17 beyond a predetermined range in order to vary the steering rigidity in non-linear manner. However, the variation in the rigidity obtained with this measure is not satisfactory in enhancing the control performance of the vehicle because the displacement of the gear housing 17 shows a predetermined steering rigidity that is determined by the gear housing mount insulators 20a and 20b until its movement is limited by the limiting arrangement.

SUMMARY OF THE INVENTION

An object of the present invention is to provide a steering system wherein the steering rigidity is variable depending upon running state of the vehicle or the rate of displacement of the steering wheel, thereby to provide enhanced control and stability performances of the vehicle and ride feel.

A steering system in accordance with the present invention comprises a steering gear, a gear housing having the steering gear received therein, a gear housing mount insulator means that mounts it on the vehicle body, and a means for restraining the transverse displacement of said gear housing that is allowed by the gear housing mount insulator means.

BRIEF DESCRIPTION OF THE DRAWINGS

FIG. 2(a) is a schematic view of a first embodiment of a steering system according to the present invention;

FIG. 2(b) is a section taken along line II—II in FIG. 2(a);

FIG. 3 is a fragmentary sectional view of a second embodiment of a steering system according to the present invention;

FIG. 4 is a graph showing performance curves of the steering system shown in FIG. 3;

DESCRIPTION OF THE EMBODIMENTS

Figure 1A:
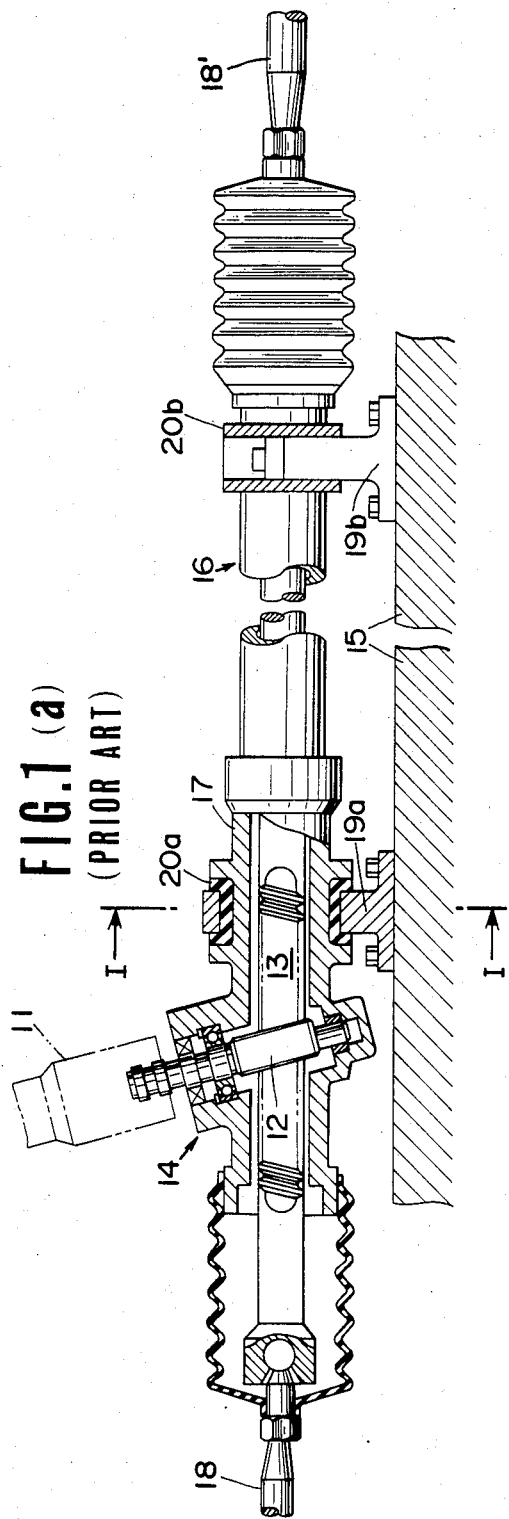
FIG. 1(a) a fragmentary, partly sectioned, view of the previously discussed steering system according to the prior art.

Embodiments according to the present invention are described hereinafter in connection with the accompanying drawings. In the following description, like reference numerals are used to denote like parts to those used in the steering system previously described in connection with FIGS. 1(a) and 1(b).

In FIGS. 2(a) and 2(b), a first embodiment according to the present invention is shown.

Describing the construction thereof, in FIG. 2(a), 21 designates a steering wheel, which steering wheel 21 is connected via a steering shaft 11 to a steering gear mechanism 14 received in a gear housing 17. The steering shaft 11 includes an upper shaft 11a connected to the steering wheel 21, an intermediate shaft 11c connected via a first universal joint 11b to the upper shaft 11a, and a lower shaft 11e connected via a second universal joint 11d to the intermediate shaft 11c and connected also to the steering gear mechanism 14.

Figure 1B:
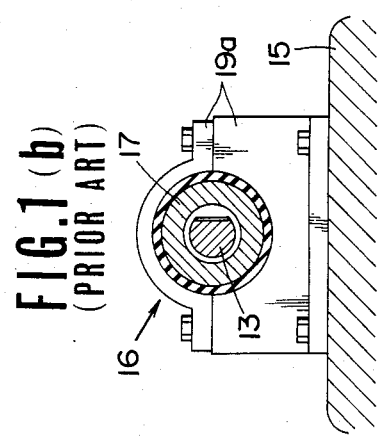
FIG. 1(b) is a section taken along line I—I in FIG. 1(a)

The steering mechanism 14 within the gear housing 17 is of the rack-and-pinion type similarly to that used in the previously described steering system (FIGS. 1(a) and 1(b)). A rack 13 thereof extends transversely of a vehicle and has opposite end portions slidably projecting from lateral end faces of the gear housing 17. At the opposite ends thereof, the rack 13 is connected via ball joints 22, 22' and tie rods (steering linkages) 18, 18' to change-direction road wheels.

The gear housing 17 is supported on a vehicle body 15 by a mounting apparatus 16. The mounting apparatus 16 has a gear housing mount insulator 20 of a rubber-like elastic body (elastic means) and a damper cylinder 23 (restraining means). The gear housing mount insulator 20 and the damper cylinder 23 are arranged in parallel between the vehicle body 15 and the gear housing 17. As specifically shown in FIG. 2(b), the gear housing mount insulator 20 is mounted between a bracket 19 bolted to the vehicle body 15 and a bearing 24 whereby the gear housing 17 is allowed to slide transversely with respect to the vehicle body. The gear housing mount insulator 20 and the bearing 24 allow the gear housing 17 freedom for transverse displacement relative to the vehicle body 15 and elastically support the gear housing 17 on the vehicle body 15.

The damper cylinder 23 includes a cylinder body 27 fixedly secured to the vehicle body via a bracket 26. A piston 29, connected to the gear housing 17 via an arm 28, is slidably received in the cylinder body 27 and divides the inside the cylinder body into two fluid chambers 30a, 30b which are filled with a fluid such as an oil. The piston 29 has a piston rod 29a extending through one end of the cylinder body 27, the chamber 30a, the other chamber 30b and the other end of the cylinder body 27. Both ends of the piston rod 29a extend the associated ends of the cylinder body 27 in a seal tight manner. These fluid chambers 30a, 30b have mounted therein return springs 30c and 30d respectively for the piston 29, and are communicated with each other via a passage 32 having mounted therein a manually operable throttle valve 31, and thus they are variable in volume in a complementary manner in response to the displacement of the piston. The throttle valve 31 is manually operable to adjust the setting of a chocked portion 32a providing a small flow cross sectional area in a portion of the passage 32, and thus the small flow cross sectional area can be manually adjusted by manipulating the throttle valve 31.

33, 33' designate stops fixed to the gear housing 17 on the opposite sides of the bracket 26. These stops 33, 33' cooperate with the bracket 26 in such a manner that when the gear housing 17 tends to excessively displace, such displacement is hampered by abutting engagement of one of the stops 33, 33' with the bracket 26.

With the steering system as mentioned above wherein the gear housing 17 is allowed to displace relative to the vehicle body 15, manipulating the steering wheel 21 causes the gear housing 17 to displace due to steering resistances from the change-direction road wheels and the damper 23 cylinder provides a damping force, i.e., a frictional force, which corresponds to a rate of displacement of the gear housing 17. That is, the damping force provided by the damper cylinder 23 corresponds to the rate of displacement of the gear housing 17 because when the gear housing 17 displaces relative to the vehicle body 15, the displacement of the piston 29 causes the fluid to flow between the fluid chambers 30a and 30b via the passage 32 and the throttle valve 31. This means that the larger the rate of displacement of the gear housing 17, the larger the rigidity of the mounting apparatus 16. Therefore, this steering system provides a good steering response when the driver manipulates the steering wheel 21 to steer clear of involvement in an accident in emergency circumstances, thus allowing quick control of the vehicle to avoid the accident, but it provides the mounting appratus 16 with a relatively small rigidity and thus a low steering response when the driver slowly steer the steering wheel 21 to change lane on at high vehicle speeds, thus providing a smooth steering characteristic with a low steering response.

Besides, this steering system allows the driver to adjust the steering characteristics to meet his preference only by manipulating the throttle valve 31. Thus, the control performance of the vehicle can be made better.

In FIG. 3, a second embodiment according to the present invention is illustrated.

In this second embodiment, the rigidity of the mounting apparatus 16 in the previously described first embodiment is controlled in response to the vehicle speed. Like reference numerals are used to denote like parts to those in the previously described first embodiment and description thereof is omitted in the following.

As shown in FIG. 3, a gear housing 17, having received therein a steering mechanism including a rack 13 and a pinion 12, is supported on a vehicle body 15 by a mounting apparatus 16 including two gear housing mount insulators 20a, 20b and a damper cylinder 16. The rack mount insulators 20a, 20b are disposed between the gear housing 17 and the vehicle body 15 at two portions spaced from each other in the transverse direction of the vehicle body, whereas the damper cylinder 23 is mounted between a bracket 26a fixedly secured to the gear housing 17 at a portion between the two gear housing mount insulators 20a, 20b and a bracket 26a fixedly secured to the vehicle body 15 in a parallel relationship with respect to the gear housing mount insulators 20a, 20b.

The damper cylinder 23 includes a cylinder body 27 mounted to the bracket 26b on the vehicle body 15 via elastic bodies 33b, and a piston 29 having a piston rod 34 thereof mounted to the bracket 26a on the gear housing 17 via elastic bodies 33a. The piston 29 is slidably received in the cylinder body 27 and defines therein two fluid chambers 30a, 30b. These fluid chambers 30a, 30b are communicated with each other via a passage 32 provided with a variable throttle valve 35 and thus are variable in volume in a complementary manner in response to displacement of the gear housing 17 relative to the vehicle body 15. 37 designates a gas chamber which is disposed within the cylinder body 27 and filled with a gas. This gas chamber 37 absorbs a volume change in the fluid chambers 30a, 30b displaced by the piston rod 34.

The variable throttle valve 35 includes a needle 35a having a tapered head portion projecting into the passage 32 to define a restricted portion 32a, and a solenoid 35b for driving the needle 35a. In operation, the variable throttle valve 35 varies continuously opening area of the restricted portion 32a when the tapered head portion of the needle 35a is urged to project into the passage 32 by the solenoid 35b.

35 designates a controller (control means). This controller 36 is electrically connected with the solenoid 35b of the variable throttle valve 35 and also with a vehicle speed sensor 38. This controller 38, when in operation, controls the supply of current through the solenoid 35b of the variable control valve 35 in response to a vehicle speed detected by the vehicle speed sensor 38 in such a manner that the opening area of the restricted portion 32a increases at high vehicle speed range.

According to this embodiment of the steering system, the rigidity provided by the mounting apparatus 16 is controlled in response to the vehicle speed such that the rigidity decreases at high vehicle speeds. In FIG. 4, this tendency is illustrated at two different vehicle speeds, wherein a fully-drawn bold curve A and a fully-drawn thin curve B show the tendency exhibited by the steering system provided with the mounting apparatus 16, and a yaw rate gain (corresponding to steering response) is high when a steering frequency (corresponding to the rate of displacement of the steering wheel) is high as compared to the tendency as shown by a broken curve C exibited by the steering system using the gear housing mount insulators 20a, 20b, only.

Assume now that the vehicle is running at a relatively low vehicle speed, the controller 36 controls supply of current passing through the solenoid 35b of the variable throttle valve 35 in response to the output signal of the vehicle speed sensor 38 in such a manner as to cause the needle 35a to decrease the opening area of the restricted portion 32a in the passage 32. This causes the damper cylinder 23 to produce a relatively large damping force, resulting in an increase in rigidity in the mounting apparatus 16. Therefore, if the steering wheel 21 is manipulated, an improved steering response as shown by the curve A in FIG. 4 is provided, thus providing a turning characteristic with a slight oversteer tendency which is preferrable at low vehicle speeds.

As the vehicle speed increases, the variable throttle valve 35 increases the opening area of the restricted portion 32a in the passage 32 in accordance with the vehicle speed under the control of the controller 36. This means that the rigidity in the mounting apparatus 16 drops as opposed to the case at low vehicle speeds. Therefore, the steering response drops as shown by the curve B in FIG. 4, showing an apparent oversteer turning characteristic whereby a change in a directional angle of each of the change-direction road wheels to an angle through which the steering wheel is displaced becomes small, thus ensuring improved control and stability when making a turn or changing a direction at high vehicle speeds.

As previously described, according to this steering system, the steering rigidity, i.e., the rigidity in mounting apparatus 16, becomes small during running at high vehicle speeds so that a change in directional angle of the change-direction road wheel with respect to an angle through which the steering wheel 21 is rotated (overall ratio) becomes small upon manipulating the steering wheel at high vehicle speeds. As a result, the control performance of the vehicle during running at high vehicle speeds has been enhanced.

Figure 5:
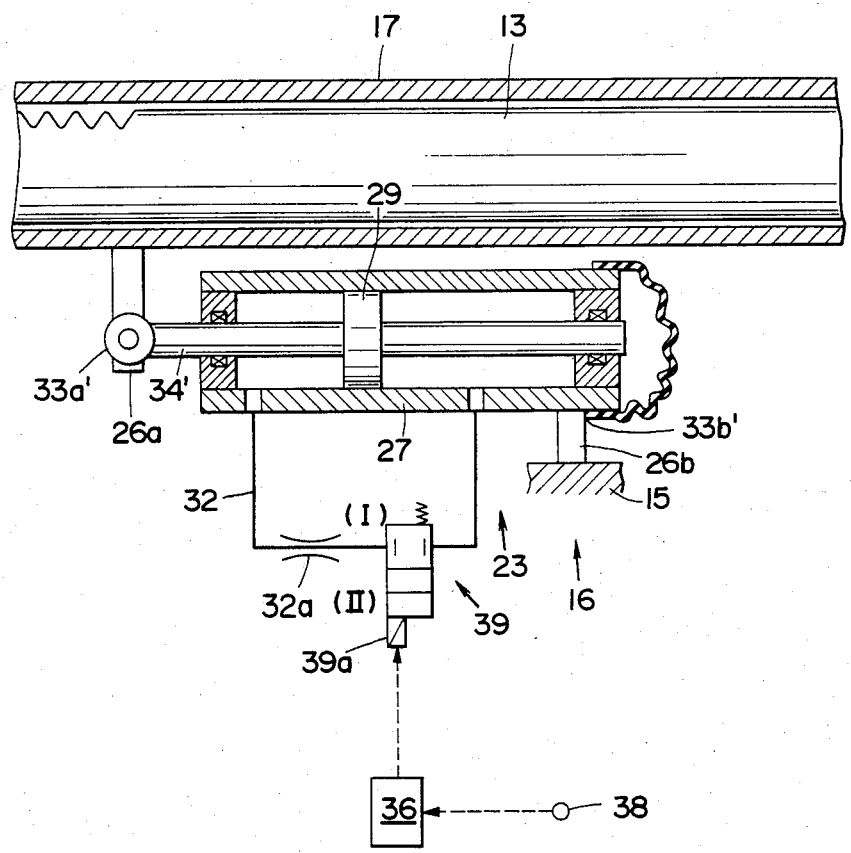
FIG. 5 is a fragmentary schematic sectional view of a third embodiment of a steering system according to the present invention.

In FIG. 5, a third embodiment is illustrated.

In this third embodiment, the rigidity of a mounting apparatus 16 similar to its counterpart in the second embodiment is varied in step manner in response to the vehicle speed. Like reference numerals are used to denote parts similar to to those used in the second embodiment and the description thereof is omitted. In this third embodiment, a damper cylinder 23 has one end connected to a bracket 26a via a pin connection 33a' and an opposite end welded at 33b' to a bracket 26b. The cylinder body 27 is therefore rigidly secured to a vehicle body 15. A piston rod 34' extends through the cylinder body 27 as shown. As shown in this Figure, a restricted portion 32a is provided in a passage 32 and an electromagnetic switch valve 39 is provided in series with the restricted portion 32a, the electromagnetic switch valve 39 being shiftable into two positions. The electromagnetic switch valve 39 includes a solenoid 39a electrically connected with a controller 36. When the solenoid 39a is not energized, the passage 32 is blocked (first position I), while when it is energized, the passage 32 is opened for flow communication (second position II).

In this third embodiment of the steering system, the electromagnetic valve 39 assumes the first position I during running at low vehicle speeds and thus the passage 32 is blocked so that, under this condition, the displacement of a gear housing 17 is completely hampered, thereby giving the steering effort transmission system a very large rigidity. Thus, the control performance of a vehicle at low vehicle speeds is enhanced because a good steering response is provided and the turning characteristic of apparent neutral and/or oversteer tendency are provided. At high vehicle speeds, on the other hand, the electromagnetic valve 39 assumes the second position II because the solenoid 39a is energized. Under this condition, fluid chambers 30a, 30b are allowed to communicate with each other via the restricted portion 32a, thus lowering the rigidity of the steering effort transmitting system. Therefore, because the turning characteristic shows apparent understeer tendency and the steering response of the vehicle drops, the control performance of the vehicle during running at high vehicle speeds is enhanced.

Although in the second and third embodiments, the restraining means has been in the form of a damper cylinder 23, a means such as a clutch which can provide frictional forces variable with vehicle speed between the gear housing 17 and the vehicle body 15 may be used for the present invention.

Figure 6:
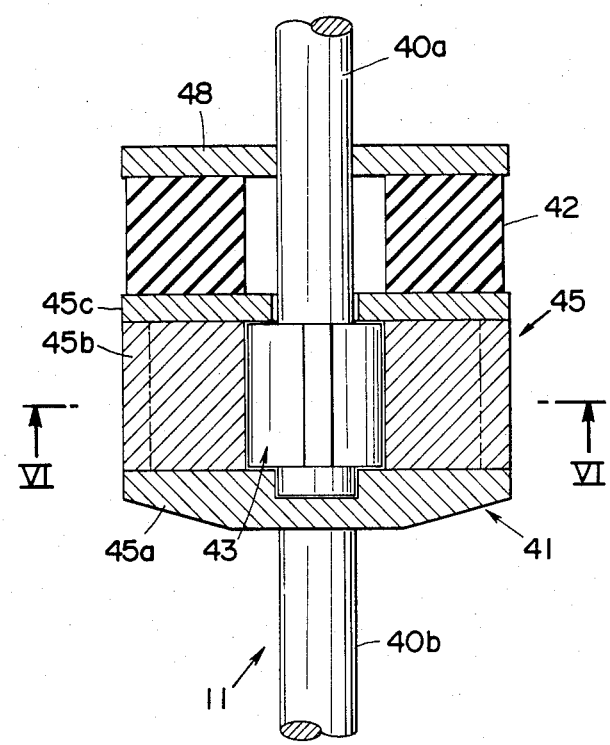
FIG. 6(a) is a fragmentary schematic sectional view of a fourth embodiment of a steering system according to the present invention.
FIG. 6(b) is a section taken along line VI—VI in FIG. 6(a).
Figure 6:
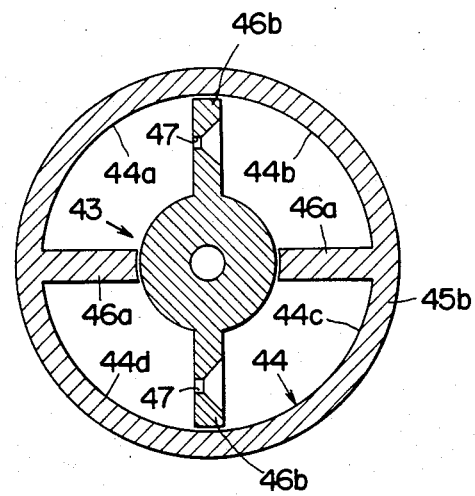

In FIGS. 6(a) and 6(b), a fourth embodiment according to the present invention is illustrated. Like reference numerals are used to denote like parts to those used in each of the previously described embodiments, and the description thereof is omitted.

In this embodiment, an elastic means and a damping means are arranged in parallel in a steering effort transmission system, i.e., particularly in a steering shaft 11.

As shown in FIGS. 6(a) and 6(b), a steering shaft 11 is composed of a first shaft 40a connected to a steering wheel 21, a second shaft 40b connected to a steering gear mechanism 14, a damper 41 (restraining means) and a bush (elastic means) 42 which are arranged in parallel to establish a connection between these first and second shafts 40a and 40b. The damper 41 includes a rotary body 43 provided on one end of the first shaft 40a and a casing 45 provided on the adjacent end of the second shaft 40b and defining a chamber 44 receiving therein the rotary member 43. The casing 45 comprises a disc 45a fixedly connected to the second shaft 40b, a cylindrical member 45b having one end fixedly connected to the disc 45a, and an annular member 45c fixedly connected to an opposite end of the cylindrical member 45b. The cylindrical member 45b has two diametrically opposed vanes 46a projecting into the chamber 44 from an inner wall thereof, and the rotary member 43 has two diameterically opposed vanes 46b projecting into the chamber 44. These four vanes 46a, 46a and 46b, 46b divide the chamber 44 into four sub-chambers 44a, 44b, 44c and 44d which are filled with fluid. The two fluid chambers 44a and 44b are allowed to communicate with each other via a restricted hole 47 formed through one of the vanes 46b, and similarly, the other two fluid chambers 44d and 44d are allowed to communicate with each other via a restricted hole 47 formed through the other vane 46b. These chambers are variable in volume in a complementary manner when the first shaft 40a displaces in a rotational dirction relative to the second shaft 40b.

The bush 24 is made of a rubber-like elastic body and has one end fixedly connected to a flange 48 fixedly secured to the first shaft 40a and an opposite end fixedly connected to the previously mentioned annular member 45c.

In the steering system of this kind, the bush 42 allows elastic relative rotational displacement between the first shaft 40a and the second shaft 40b and besides the damper 41 provides a damping force variable with the relative speed between the first shaft 40a and the second shaft 40b when the steering wheel 21 is manipulated. That is, the relative rotational displacement between the first shaft 40a and the second shaft 40b causes resticted flow via the restricted hole 47 between each of two pairs of fluid chambers 44a and 44b and 44c and 44d, thus producing a damping force variable with the rate of relative displacement between the first shaft 40a and the second shaft 40b. Therefore, similarly to the first embodiment, the steering effort transmission system of this steering system provides a large rigidity upon rapid steering of the steering wheel 21 so as to ensure steering clear of involvement in an accident in emergency circumstances.

Although in the previously described embodiments, the present invention has been embodied as being applied to the rack-and-pinion type steering system, the present invention may be applied to another different steering system having a recirculating ball type steering gear mechanism.

As will be understood from the preceding description, in the various embodiments, the steering rigidity can be varied in response to the rate of displacement of a steering wheel or a running state of a vehicle, thus providing an enhanced control of the vehicle.

In the case of the first and fourth embodiments, since the steering rigidity becomes large upon rapidly rotating a steering wheel through a large angle, it is ensured that the vehicle can steer clear of involvement in an accident. In the case of the second and third embodiment, since the steering rigidity is made small during running at high vehicle speeds, the turning characteristic of vehicle becomes apparent neutral and/or oversteer tendency during running at low vehicle speeds and becomes understeered during running at high vehicle speeds, thus ensuring an improved control performance of the vehicle.

We claim:

1. In a vehicle having a vehicle body and a change-direction road wheel,
   a steering system including:
   a steering gear and a gear housing having received therein said steering gear;
   gear housing mount insulator means for elastically supporting said gear housing on the vehicle body in such a manner as to allow transverse displacement of said gear housing; and
   restraining means independent of the support of said gear housing by said gear housing mount insulator means for restraining said tranverse displacement of said gear housing allowed by said gear housing mount insulator means.

2. In a vehicle as claimed in claim 1, wherein said restraining means comprises a damper which is operatively connected to the vehicle body and said gear housing so as to control said transverse displacement of said gear housing.

3. In a vehicle as claimed in claim 2, wherein said damper has a cylinder body, fixedly connected to the vehicle body, a piston fixedly connected to said gear housing and slidably disposed in said cylinder body to define two fluid-filled chambers communicating with each other via a fluid passage and means for restricting fluid flow through said passage.

4. In a vehicle as claimed in claim 1, wherein said restraining means includes a vehicle speed sensor sensing a vehicle speed of the vehicle and generating a sensor output signal, a damper, and means for controlling the characteristic of said damper in response to said sensor output signal.

5. In a vehicle as claimed in claim 4, wherein a force produced by said damper for restraining said transverse displacement of said gear housing is large when the vehicle runs at low vehicle speeds as compared to that when the vehicle runs at high vehicle speeds.

6. In a vehicle as claimed in claim 4, wherein said restraining means completely hampers said transverse displacement of said gear housing when the vehicle runs at low vehicle speeds.

* * * * *